UNITED STATES PATENT OFFICE.

HERBERT C. GORE, OF TAKOMA PARK, MARYLAND.

PROCESS FOR THE MANUFACTURE OF DEXTRIN AND OTHER MODIFIED STARCH PRODUCTS.

1,335,162.     Specification of Letters Patent.     Patented Mar. 30, 1920.

No Drawing.     Application filed June 21, 1919. Serial No. 305,937.

(FILED UNDER THE ACT OF MARCH 3, 1883, 22 STAT. L., 625.)

*To all whom it may concern:*

Be it known that I, HERBERT C. GORE, a resident of Takoma Park, Maryland, have invented a new and useful Process for the Manufacture of Dextrin and other Modified Starch Products, of which the following is a specification.

This application is made under the act of March 3, 1883, chapter 143 (22 Stat. L. 625), and the invention herein described and claimed, may be used by the Government of the United States, or any of its officers or employees, in the prosecution of work for the Government, and any person in the United States, without payment to me of any royalty thereon.

My invention relates to a novel method of making dextrin, British gum, thin boiling starch and other modified starch products. According to the usual methods dextrin, for example, is manufactured by mixing powdered starch with very dilute nitric or hydrochloric acid sufficient to dampen it and subjecting the acidulated starch to a roasting operation. This operation is continued until the starch powder is dextrinized or until approximately the desired degree of dextrinization is obtained. As a consequence of the slow conduction of heat of the powdered starch the time of conversion is necessarily very long. Ordinarily dextrinization is carried on in a flat bottomed pan fitted with a stirring mechanism so as to keep the mass stirred during the conversion. It has been difficult to produce a homogeneous product free from specks and lumps owing to the difficulty of obtaining a perfect distribution of the acid to the starch and a uniform heating of the entire batch. Upon warming the powder, usually by admitting steam or hot water to the jacket of the converter, the water distils out and collects on the sides and cover of the kettle and upon the stirring mechanism. This condensed moisture mixes with starch dust and starch paste is formed which later dries and flakes off, falling into the mass of starch undergoing conversion. During conversion more or less fine dust is constantly rising from the heated mass of starch. During the later stages of the conversion this dust becomes very dry and consequently very explosive. A spark, overheated bearing of the stirring mechanism, or other like cause is sufficient to cause a disastrous explosion.

I have developed a method of manufacture of dextrin in which an open granular mass of prepared starch substantially free from dust is used as the material to be converted, and convert the same into dextrin in such a manner that no stirring is necessary and substantially no dust is formed during the conversion. Furthermore, by my process the dextrin can be easily moistened to any desired moisture content without removing it from the converter and the product then discharged ready for packing or for grinding and bolting. By my invention the process of the manufacture of dextrin is greatly shortened. Indeed, I find that heating for a few minutes only is all that is necessary in the production of soluble starch and white dextrin. Moreover, the equipment required for my process is simple and inexpensive.

In carrying out my process I take the ordinary starch of commerce containing, in case of potato starch, from 18 to 20 per cent. of water. I add to this starch approximately one fifth of its weight of a dilute solution of the acid desired, usually hydrochloric or nitric acid, which solution contains preferably from 1 to 5 per cent. of dextrin based on the starch. For example, on the laboratory scale, the following are satisfactory proportions of ingredients for the manufacture of white potato dextrin: 1000 g. starch, 20 g. white dextrin, ½ cc. concentrated HCl and 200 cc. of water. In preparing the solution to be mixed with the potato starch I dissolve the dextrin in the water or in a portion of the water, boiling if necessary to form a clear solution, then add the rest of the water, cool substantially to room temperature or at any rate below the cooking temperature of the starch and add the acid. This mixture is then added to the starch substance in the proportion specified. I then mix the starch intimately with this solution. On the laboratory scale, I find that an ordinary meat chopper answers this purpose satisfactorily, passing the material repeatedly through the chopper until the acidulated dextrin containing water is thoroughly incorporated with the mass of starch. A plastic mass of starch is thus obtained which is subdivided by the meat chopper or other means into small granules which may be of any desired size or shape such that the product forms an open mass through which air will readily pass. I prefer about the size of coffee berries or larger. The product is dried in any suitable manner such that a granular mass substantially free from dust is formed or if the drying process is such as to cause the formation of a considerable proportion of dust and very fine particles I remove substantially all of such dust or fine particles before the conversion. In drying I prefer to place the material in masses of from 3 to 6 inches thick upon a suitable drying tray and dry by passing a current of warm air in a condition to absorb moisture from the material, but any other drying method can be employed. I then dextrinize while heating the material in an open mass on the drying tray by heating the entire mass, such as; by passing through it a current of air of the temperature desired. While the temperature and times of heating vary greatly, depending on the kind of starch employed, the following example shows the conditions under which starch can be dextrinized to form a white or yellow dextrin, namely 100° C. for from one-half hour to one hour will yield a white dextrin suitable for the manufacture of library paste. A heat treatment of 120° to 135° C. for from one-half hour to one hour yields a somewhat more soluble white dextrin. Treating at 150° C. for from one-half hour to one hour yields a soluble yellow dextrin. As the temperature and treating time are increased darker colored products results, the proportions of nitric or hydrochloric acids present being about two parts per thousand of partially dried starch. I find that a drier of the type used in drying sweet corn and certain other products is especially useful as a converter. Any suitable drier in which the air is blown freely through the material is suitable for use in carrying out my process. In the manufacture of dextrin a variety of fabrics or other covering for the top of the plenum chamber can be used. I prefer, however, galvanized wire netting suitably supported to form a flat surface on which is fastened ordinary muslin, as in this way the danger of the product blowing off the tray in the event of temporary excessive air pressure is much lessened. Driers of other types can also be employed as converters for the dextrin. The reason why I prefer a drier of the type described is the fact of the convenience attending its use, the simplicity of construction and low first cost, and more than all, the uniformity with which heating and consequent formation of dextrin is accomplished as by the use of this plenum chamber the rate of flow of air through each portion of the screened top of the chamber is substantially uniform. Once the conversion has been effected, it is only necessary to supply the converter with cool air containing the necessary amount of moisture in order that the dextrin shall have acquired the desired amount of moisture to bring its moisture content into substantial equilibrium with that of the atmosphere. I find that if desired the dextrin used as a binder can be omitted from the original mixture, in which case a much more friable mass of dried material results, and I find further that the dextrin used as a binder may be omitted from the original mixture in case of such starches as when ordinarily dried in the lump form are not dusty. For potato starch, however, it is desirable to use the dextrin as described above. I am aware that by the older methods of manufacture of dextrin it was customary to mold the starch with acidulated water in the form of compact balls or cakes and then dry and dextrinize. However, no binding material was employed in the production of dried acidulated starch ready for roasting and the roasting was accomplished in flat pans in special ovens and not in driers of the special form which I find most advantageous. What I claim as new is, first, a process of manufacturing dextrin which consists in mixing potato starch of commerce with sufficient water so that the amount of water present is about one-third that of the entire mass, the water containing sufficient amounts of nitric, hydrochloric, or other acid to accomplish the necessary degree of conversion desired and then coarsely subdividing the material to form an open mass through which the air can readily pass, then drying the material and finally passing hot air through the material, in this way accomplishing the dextrinizing of the product to the degree desired. Second, the process of the manufacture of dextrin consists in adding to ordinary commercial starch an amount of water approximating one-third of the weight of the resulting mixture of starch in water, such water containing the acid necessary for the conversion of the starch in the dextrin and from 1 to 3 per cent. of dextrin, mixing the mass uniformly, subdividing it coarsely and drying by passing a current of warm air in a condition to absorb moisture through the material and finally roasting in a current of warm air.

I claim:

A process of manufacturing dextrin which consists in adding to a quantity of starch a suitable amount of acidulated water together with a small proportion of dextrin to act as a binder, forming the mixture into an open mass, drying the same, and dextrinizing with a current of warm air.

HERBERT C. GORE.